(12) United States Patent
Hock et al.

(10) Patent No.: US 8,124,268 B2
(45) Date of Patent: Feb. 28, 2012

(54) GASKET AND A BIPOLAR BATTERY

(75) Inventors: David Hock, Castle Rock, CO (US); Lars Fredriksson, Täby (SE); Neil H. Puester, Aurora, CO (US)

(73) Assignee: Nilar International AB, Täby (SE)

( * ) Notice: Subject to any disclaimer, the term of this patent is extended or adjusted under 35 U.S.C. 154(b) by 1237 days.

(21) Appl. No.: 11/889,201

(22) Filed: Aug. 9, 2007

(65) Prior Publication Data

US 2008/0070106 A1    Mar. 20, 2008

Related U.S. Application Data

(63) Continuation-in-part of application No. 10/712,018, filed on Nov. 14, 2003, now Pat. No. 7,445,869.

(51) Int. Cl.
  *H01M 2/08* (2006.01)
  *H01M 2/16* (2006.01)
  *H01M 2/18* (2006.01)
  *H01M 6/48* (2006.01)

(52) U.S. Cl. ............... 429/130; 429/185; 429/210

(58) Field of Classification Search .......... 429/130, 429/185, 210
  See application file for complete search history.

(56) References Cited

U.S. PATENT DOCUMENTS

| | | |
|---|---|---|
| 4,008,099 A | 2/1977 | Lindström |
| 4,164,068 A | 8/1979 | Shropshire et al. |
| 4,275,130 A | 6/1981 | Rippel et al. |
| 4,614,025 A | 9/1986 | vanOmmering et al. |
| 5,344,723 A | 9/1994 | Bronoel et al. ............... 429/84 |
| 5,611,823 A | 3/1997 | Klein ........................ 29/623.5 |
| 5,618,641 A | 4/1997 | Arias ......................... 429/210 |
| 5,688,615 A | 11/1997 | Mrotek et al. ............... 429/210 |
| 5,916,709 A | 6/1999 | Arias et al. ................. 429/210 |
| 6,139,987 A | 10/2000 | Koo et al. ................... 429/210 |
| 2003/0072998 A1 | 4/2003 | Fredriksson et al. ........ 429/210 |
| 2005/0260493 A1 | 11/2005 | Frederiksson et al. ...... 429/210 |

FOREIGN PATENT DOCUMENTS

| | | |
|---|---|---|
| EP | 0 631 338 A1 | 12/1994 |
| EP | 0 676 822 A1 | 10/1995 |
| WO | WO 01/03224 | 1/2001 |
| WO | WO 01/03225 | 1/2001 |

*Primary Examiner* — Tracy Dove
(74) *Attorney, Agent, or Firm* — Capitol City TechLaw

(57) ABSTRACT

A gasket 20; 40; 80 for use in a starved electrolyte bipolar battery comprises a structural part 27; 44; 82 in the shape of a frame having an upper surface 1 and a lower surface 2, and at least one channel 23, 24; 83, 84 to permit gas passage through the gasket. The structural part is made from a first material having hydrophobic properties. The gasket 20; 40; 80 further comprises at least a first sealing surface 30; 47; 91 arranged in a closed loop projecting from the upper surface 1, and at least a second sealing surface 30; 47; 92 arranged in a closed loop projecting from the lower surface 2. The first and the second sealing surfaces are provided on at least one sealing part 26; 41, 41; 81, are made from a second material, and the first material of the structural part 27; 44; 82 has a higher elastic modulus than an elastic modulus of the second material of the sealing parts 26; 41, 42; 81. A starved electrolyte bipolar battery and a method for manufacturing a gasket are also disclosed.

38 Claims, 5 Drawing Sheets

GASKET AND A BIPOLAR BATTERY

CROSS REFERENCE TO RELATED APPLICATION

This US non-provisional application is a Continuation-in-Part of U.S. application Ser. No. 10/712,018, filed Nov. 14, 2003 now U.S. Pat. No. 7,445,869, the content of which is incorporated herein by reference.

BACKGROUND

1. Technical Field

Example embodiments relate to a gasket, and a bipolar battery including at least one gasket. Example embodiments also relate to a method for manufacturing a gasket.

2. Description of Related Art

A bipolar battery construction comprises an electrically conductive bipolar layer (or "biplate") that serves as an electrical interconnection between adjacent cells in the battery as well as a partition between the cells. In order for the bipolar construction to be successfully utilized, the biplate should be sufficiently electronically conductive to transmit current from cell to cell, chemically stable in the cell's environment, capable of making and maintaining good contact to the electrodes, capable of being electronically insulated from other biplates, and sealable around the boundaries of the cell so as to contain electrolyte in the cell.

The above characteristics are more difficult to achieve in secondary (rechargeable) batteries due to the charging potential that can generate gas inside the battery, and in alkaline batteries due to the creep nature of the electrolyte. Achieving the proper combination of these characteristics has proven very difficult.

A common type of battery design is the so called "flooded" battery wherein the electrolyte within the battery completely fills the porous spaces within the battery, with wet liquid electrolyte present in excess of that which can be absorbed by the constituent electrodes and separators within the battery. More recent battery designs are designated as "starved electrolyte" or "recombinant" batteries. In this sort of battery design, the porous spaces within the constituent electrodes and separators are not completely filled with electrolyte. Instead, some of this porous space is occupied by gases. As a result, the volume inside the battery surrounding the electrolyte is substantially dry due to the remaining potential for the capillary action of the porous spaces to absorb wet liquid electrolyte. This results in a battery configuration that is essentially damp, but not flooded or wet inside the battery. Such batteries have a volume into which gases generated within the battery can be contained. Starved electrolyte battery designs are typically much less tolerant of loss of electrolyte when compared to flooded batteries, as they have no extra wet reserve of electrolyte to compensate for electrolyte loss. Consequently, a starved electrolyte battery's internal volume is sealed from the ambient environment during normal use. It is common in the art to refer to starved electrolyte batteries as having a sealed configuration, as further described herein.

For maintenance-free operation it is desirable to operate rechargeable batteries in a sealed configuration. However, sealed bipolar designs typically utilize flat electrodes and stacked-cell constructions that present design challenges for proper containment of gases present and generated during cell operation. In a sealed construction, gases generated during charging should be chemically recombined within the cell for stable operation. The pressure-containment requirement creates additional challenges in the design of a stable bipolar configuration.

Technical fields such as transportation, communications, medical and power tools (for example) are generating specifications that existing batteries cannot meet. These include higher cycle life and the need for rapid and efficient recharges.

NiMH systems are seen as an alternative to meet cycle life specifications, but costs for existing conventional fabrication are too high.

In U.S. Pat. No. 5,344,723 to Bronoel et al., a bipolar battery is disclosed having a common gas chamber, which is created by providing an opening through the biplate (conductive support/separator). The opening is also provided with a hydrophobic barrier to prevent passage of electrolyte through the hole. Although a problem with pressure differences between the cells may be avoided, there is still a disadvantage with the described battery. The outer sealing around the edge of each biplate still has to be fluid-tight, which is very difficult to achieve. If the outer sealing is not fluid-tight, the electrolyte, contained in the separator between the electrodes and in the electrodes, may migrate and form a continuous ionic current leakage path from one cell to another.

In U.S. Pat. No. 5,441,824 to Rippel, a quasi-bipolar battery is disclosed where the structure of the battery attempts to address problems inherent when using the corrosive lead-acid chemical system in a bipolar configuration having biplates and separators. Here, the biplate edges are encapsulated within a gas-tight continuous compliant frame material. The separator edges are also similarly encapsulated in a gas-tight continuous complaint frame having gas passages formed into them. Such encapsulation processes are expensive and difficult to accomplish in a reliable, manufacturable fashion. The frame design disclosed by Rippel has comparatively large areas present along the sealing surfaces. As a result, large forces are needed to cause the required compressive strain in the disclosed frame necessary to induce a gas tight seal. This large force must be borne by the structure of the battery, resulting in larger size, higher weight and increased cost of the resulting battery. Rippel's disclosure also does not address the problem of ionic currents that may flow in the electrolyte present in the gas passages that can cause imbalanced self-discharge of individual bipolar electrodes in the battery.

The use of a common manifold for primary (non-rechargeable) reserve batteries to be activated in the field by filling of the electrolyte immediately prior to use is well known in the art. In U.S. Pat. No. 4,626,481 to Wilson discloses a flooded bipolar battery design using a primary reserve activated Li/SOCl$_2$ system. This design comprises a frame encapsulating a biplate. This disclosure refers to this frame as an "insulating layer". Again, such a continuous encapsulation is expensive and more difficult to manufacture. Wilson addresses the problem of reducing ionic currents that may flow in the electrolyte present in the gas passages by teaching use of a low conductivity electrolyte, which is clearly undesirable in a starved electrolyte secondary battery when high power density is desired.

In the published international patent application WO 03/026042 A1, assigned to the present applicant, a hydrophobic barrier is introduced around the electrodes instead of around the opening in the biplate (as disclosed in U.S. Pat. No. 5,344,723). A pressure relief valve is also introduced to prevent a pressure build up inside the case. It is however rather expensive to manufacture a bipolar battery of this design in large quantities and therefore there is a need to construct a new bipolar battery having a smaller quantity of components, using simpler processing techniques to manufacture a bipolar battery.

In the published international patent application WO 2005/048390 A1, assigned to the present applicant, a bipolar battery design is disclosed. The bipolar battery has a gasket made from a hydrophobic material with a built-in gas passage arranged between adjacent biplates, wherein the gas passages within the gaskets create a common gas space within the battery and at the same time electrolyte is prevented from migrating between cells. However, a high degree of mechanical preloaded force should be maintained over the gaskets to achieve these objectives, which in turn requires an outer casing that may withstand the stress that will result from the force needed. Teaching of details regarding top level construction resulting in a finished starved electrolyte bipolar battery is found in this published international patent application WO 2005/048390 A1, which is incorporated here by reference.

SUMMARY

Example embodiments provide a gasket that will reduce the mechanical preloaded force needed over the gaskets to maintain a sealed gas space, and prevent wet electrolyte bridging that can allow ionic currents to flow between cells within a bipolar battery.

Example embodiments may implement a gasket with hydrophobic properties in the shape of a frame including a gas passage. The frame comprises at least two parts, wherein a first part provides sealing and a second part provides a mechanical structure. The material of the first part is more deformable than the material of the second part. Put differently, the material of the first part has a lower elastic modulus than the material of the second part.

According to example embodiments, the reduced facing area of the deformed sealing surface when assembled into a battery results in less required compressive force needed to maintain a seal.

According to example embodiments, a less rigid and lighter casing may be used to maintain a pressure tight seal and a common gas space within the battery. This in turn reduces the weight of the completed bipolar battery compared to prior art batteries.

Example embodiments provide additional cost and assembly benefits compared to prior art devices.

According to example embodiments, a stack of gaskets within a bipolar battery is more stable than a bipolar battery provided with prior art gaskets.

According to example embodiments, a better seal uniformity is achieved since a more deformable part is providing the sealing.

The above and other features of example embodiments will become apparent to those skilled in the art from the following detailed description of the disclosed bipolar electrochemical battery and the biplate assembly. It will be understood that the details of example embodiments are shown by way of illustration only and not as limitations of the invention. The principles and features of this invention may be employed in varied and numerous embodiments without departing from the scope of the invention.

BRIEF DESCRIPTION OF THE DRAWINGS

The drawings are not to scale.

DETAILED DESCRIPTION OF EXAMPLE, NON-LIMITING EMBODIMENTS

Figure 1:
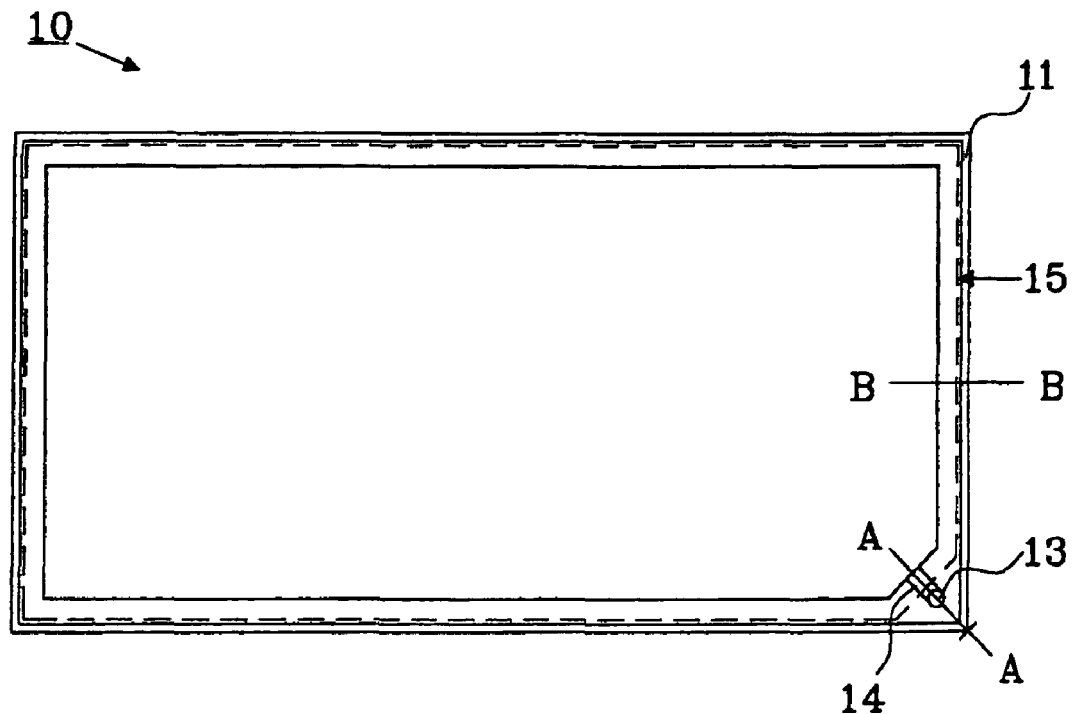
FIG. 1 is a plan view of a prior art gasket.

Benefits of the bipolar battery design include simplicity and low resistance losses. The parts count of the battery is relative low, and may consist only of endplates and biplates, with appropriate assembly of electrodes, separators and electrolyte and sealing components. Batteries of a desired voltage are constructed by stacking the required number of biplates. The electrical connections between the cells are made as the battery is stacked, since each biplate is electrically conductive and impervious to electrolyte.

With terminals at each end of the stack, the flow of current is perpendicular to the plate, which ensures uniform current and voltage distribution. Since the current path is very short the voltage drop is significantly reduced.

Bipolar batteries will also have significantly reduced weight, volume and manufacturing costs due to elimination of components and the manufacturing approach.

A problem with bipolar batteries is obtaining a reliable seal between cells. Different solutions to this problem have been disclosed in the published international patent applications WO 03/009413, WO 03/026055 and WO 03/026042, and in the published pending US applications US2004/0091784 and US2005/0260493, all of which are assigned to the present applicant, and hereby incorporated by reference.

The seal on a cell is of extreme importance for all types of batteries, and bipolar batteries are no exception. Individual cells contain the active materials (for NiMH batteries, for example, it is Nickel hydroxide positive and metal hydride hydrogen storage alloy negative, respectively), separator and electrolyte. The electrolyte in the separator is required for ion transport between the electrodes and the separator provides insulation to the conduction of electronic current flow between the electrodes. Designs, optimized for longevity, weight and volume, require recombination of gasses.

Batteries produce gasses as they are charged. The gassing rate increases as the battery nears full charge, and reaches maximum when fully charged. The gasses which are produced are primarily oxygen and hydrogen.

For Nickel based bipolar batteries, such as NiMH and NiCd, oxygen will recombine relatively rapidly with available chemically active material in the negative electrode. Batteries are normally designed so oxygen will be the first gas generated if the cell is overcharged. This requires two actions:

1) Overbuild the negative active material, generally by 30%, to ensure that the positive electrode, which will gas oxygen on charge, will be the first to gas.

2) In a starved electrolyte battery, provide for gas passage from the positive to the negative, where the oxygen will recombine. The gas passages are obtained by controlling the amount of electrolyte within the pores of the electrode and through the separator. The surfaces of the electrode must be covered by a thin layer of electrolyte for the transport of ions, but the layer must be thin enough to permit gas diffusion through the layer, and must allow gas passages throughout the active layers and the separator.

The negative electrode alone would gas hydrogen if overcharged. Because gaseous hydrogen does not recombine quickly, pressure would build up within the cell. If the rate of transport of oxygen across the cell from the positive electrode is not unduly impeded, then the oxygen recombination effectively discharges the negative at the same rate it is being charged, thus preventing overcharge of the negative.

The surface area of the active material, the porosity of the electrode, and the presence of gas passages within the porous volumes in the battery components enhance rapid recombination.

For clarity sake, a starved electrolyte battery is defined as is an essentially moist but not wet construction, as opposed to flooded batteries like a typical lead acid car battery.

The bipolar approach helps ensure that the voltage drop across the active material will be uniform in all areas, so that the entire electrode across its facing area will come up to full charge at the same time. This is due to the more uniform distribution of current density across the electrode face present in the bipolar approach. This helps reduce the problem of inhomogeneous charge across the electrode area found in many conventional constructions, where parts of an electrode are overcharging and gassing while other (remote) areas of the electrode are not yet fully charged.

The cells in regular batteries are sealed to contain the gases and electrolyte both for proper performance of the cells, and to prevent electrolyte paths, i.e. continuous ionically conductive paths, between adjacent cells. The presence of electrolyte paths between cells will allow the electrodes of the electrolyte-connected cells to discharge at a rate that is determined by the resistance of the path (length of path and cross section of path). The seals on bipolar batteries are more important because the electrolyte path is potentially much shorter. A feature of this disclosure is the use of a gasket with an integrated electrolyte barrier to minimize or eliminate the conductivity of any potential ionic conduction path. An additional concern is the amount of heat generated by operation of the cell. Depending on the magnitude of heat generated, the design must be able to reject the heat and maintain a safe operating temperature.

If an electrolyte path is developed between cells, a small intercellular leakage can be overcome by the periodic full charging of the battery. The battery may be overcharged by a set amount and at a low rate. The low rate would allow fully charged cells to recombine gasses without generating excessive pressure and also allow for easier conduction of the heat from the recombination/overcharge away from the battery. Cells that have small intercellular electrical leakage paths would become balanced.

It is rarely necessary that a battery be fully charged to achieve its useful function. Batteries are routinely over specified and overbuilt. If an application requires 50 AH (Ampere Hours), the requirement is usually specified at least 10% higher. Since batteries lose capacity over their lifetime, the capacity of a new battery is increased by the expected loss, resulting in possibly a 70 AH requirement for a new battery in this example. The manufacturer will probably have a median design target of 75 AH to allow for variations in the manufacturing process. Some of this overbuild is to compensate for the life capacity degradation that is caused by the overcharging.

A feature in the prior art bipolar batteries is the creation of a common gas space within the battery. The means for creating a common gas space for all cells in a bipolar battery comprises a gasket having a predetermined shape. The gasket is arranged between adjacent biplates and/or a biplate and an end plate, as described below. The gasket is preferably made with a thermoplastic elastomer compound that forms a seal with the biplate under pressure. One or more gas channels are molded into the frame to ensure a continuous gas transmission path. When several gaskets are stacked upon each other a common gas space will be created which will eliminate the pressure difference between the cells in a bipolar battery. Note that such a common gas space is sealed from the ambient environment.

FIG. 1 shows a prior art gasket 10. The gasket 10 is manufactured in a hydrophobic material having deformable properties, such as an elastomer or other material that create a continuous seal when deformed, to be able to function as a sealing. The gasket has elastic properties, and a suitable material is a thermoplastic elastomer. Thermoplastic elastomers may be obtained from several manufacturers e.g. Engage® 8407 available from DuPont Dow Elastomers, DYNAFLEX® G2780-001 available from GLS Corp. or KRATON™ G-7705 available from Kraton™ Polymers. The gasket is injection molded into the desired size and shape.

The gasket 10 is provided with a rim 11 at the edge on the upper surface and a corresponding indentation 12 on the reverse surface. The rim 11 and the indentation 12 will provide alignment of the gaskets when they are stacked upon each other in an assembled battery. The rim further serves to align the biplate relative to the gasket. The gasket is further provided with a through-hole 13 and a groove 14 to connect the through-hole 13 to the space on the inside of the gasket 10 when a biplate is mounted to the gasket. The through-hole 13 and the groove 14 provide a gas channel between adjacent cells in the assembled battery, and the hydrophobic properties of the gasket prevent electrolyte from creating an ionically conductive path between adjacent cells. The gasket thus has four purposes when mounted:

1) prevent electrolyte from creating an ionically conductive path (leakage) between adjacent cells in a bipolar battery, 2) provide a gas channel between adjacent cells to create a common gas space within a bipolar battery, 3) provide an outer pressure tight seal for the cells in a bipolar battery, and 4) provide an electronically insulating support structure between biplates and between the biplates and the endplates.

Figure 2A:
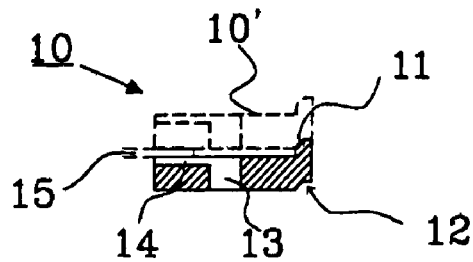
FIGS. 2a and 2b are cross-sectional views of the prior art gasket in FIG. 1.
Figure 2B:
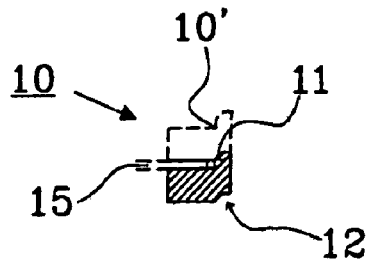

FIG. 2a shows a cross-sectional view of the gasket taken along the line A-A in FIG. 1, and FIG. 2b shows a cross-sectional view of the gasket taken along the line B-B in FIG. 1. The presence of a second gasket 10' is indicated in the figures to further show how the rim 11 is intended to be received in the indentation when mounted in a battery.

A biplate 15 is shown with a dashed line in FIGS. 1, 2a and 2b to indicate the position of a biplate 15 in an assembled bipolar battery. A portion of the groove 14 is covered by a biplate 15 to prevent electrolyte leakage between cells. A biplate with a hole aligned with the hole in the gasket may alternatively be employed to serve the purposes listed here.

Figure 3A:
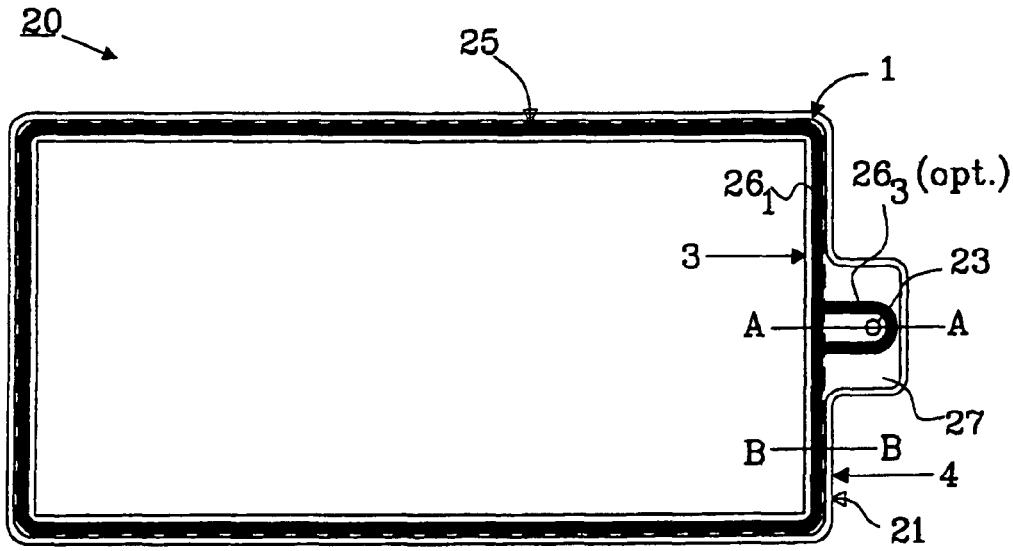
FIGS. 3a and 3b are top and bottom plan views, respectively, of a gasket according to an example embodiment of the present invention.
Figure 4A:
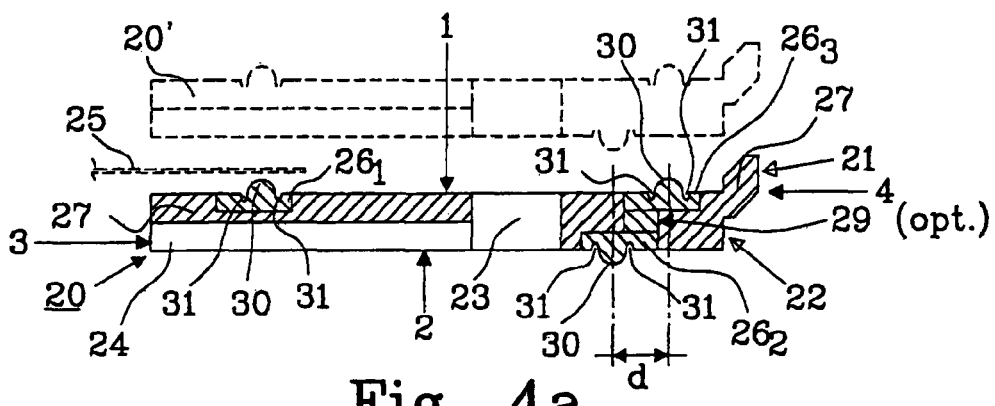
FIGS. 4a and 4b are cross-sectional views of the gasket in FIGS. 3a and 3b.
Figure 4B:
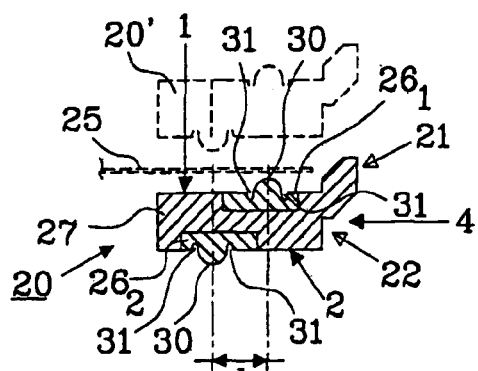
Figure 3B:
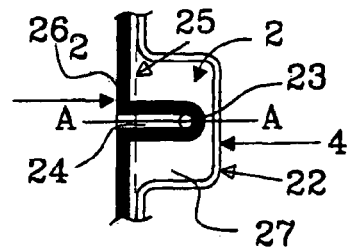

FIG. 3a is a top plan view of a gasket 20 according to an example, non-limiting embodiment. The gasket 20 comprises a structural part 27. In this example embodiment, the structural part 27 has an outer surface 4 formed by a rim 21 that extends from an upper surface 1 and a corresponding indentation 22 on an opposed, lower surface 2, see FIG. 3b. The rim 21 and the indentation 22 will provide alignment of the gaskets 20 when they are stacked upon each other in an assembled bipolar battery, as indicated in FIGS. 4a and 4b. The structural part 27 of the gasket 20 is provided with a through-hole 23 between the upper surface 1 and the lower surface 2, and a groove 24 to create a passage from the through-hole 23 to an inner surface 3 of the structural part 27, and thus the space contained inside the gasket 20 when a biplate 25 is mounted on both upper 1 and lower 2 surfaces of the gasket. The through-hole 23 and the groove 24 provide a gas channel between adjacent cells in the assembled battery. The biplate 25 is shown in phantom to indicate the position of the biplate 25 in an assembled bipolar battery. FIG. 3b shows a bottom plan view of the gasket 20 in the region containing section A-A in FIG. 3a.

The gasket comprises in, this embodiment, two parts inclusive of the structural part 27 and a sealing part 26. The sealing part 26 has more deformable properties than the structural part 27. Thus, the material used for the sealing part 26 has a smaller elastic modulus compared to the material used for the structural part 27, which has a greater elastic modulus. The structural part 27 is formed as a frame and acts as a reinforcement of the gasket 20 to provide a mechanical structure. Note that the structural part 27 does not form a continuous encapsulation of the biplate 25, as is taught in some of the prior art.

The commonly denoted sealing part 26 is comprised of a first sealing part $26_1$ arranged in a closed loop on the upper surface 1 of the structural part 27, and a second sealing part $26_2$ arranged in a closed loop on the lower surface 2 of the structural part 27 and on the outside of the hole 23, as indicated in FIGS. 3a and 3b. Furthermore, a third sealing part $26_3$ is circumventing the hole 23 on the upper surface 1 and is joined to the first sealing part $26_1$. The first and the second sealing parts $26_1$ and $26_2$ provide sealing that prevents electrolyte from migrating between adjacent battery cells when mounted in a bipolar battery. The third sealing part $26_3$ shown in this embodiment is optional and will enable vacuum filling the battery with electrolyte, as has been disclosed in WO 2005/048390 A1, which is hereby incorporated by reference.

Each sealing part 26 has a sealing surface projecting from the respective surface of the structural part 27. Each sealing surface comprises a ridge 30 that extend along the closed loops. A recess 31 is provided on each side of the ridge 30 along the closed loops. The sealing is obtained by deforming the projecting surface, i.e. the ridge 30, of each sealing part 26 against the biplate 25 or against the surface of an adjacently arranged gasket as shown in FIGS. 4a and 4b. If recesses 31 are present, material from the ridge 30 will deform into the recesses 31 when compressed.

The structural part 27 is preferably manufactured in one piece (i.e., having a unitary one-piece construction), and the sealing part 26 is preferably molded in one piece using an overmolding technique, as described in more detail below. Regularly spaced openings 29 are provided in the structural part 27 along the frame, and the sealing part 26 is preferably injection overmolded onto the structural part 27 using these openings 29 to distribute the smaller elastic modulus material used to create the first $26_1$, the second $26_2$, and optionally the third $26_3$ sealing part at the same time in a topologically connected manner. The technique of overmolding elastomeric materials onto more rigid substrates is well known in the art of plastic part manufacturing, and is not described in further detail here. It is of course possible to manufacture one or more of the sealing parts individually in a topologically disconnected manner, as indicated in FIGS. 5a, 5b, 6a and 6b. These sealing parts are preferably formed onto the structural part 27 using injection molding, and may also be fabricated separately and assembled into a completed gasket 20. The structural part may be manufactured using casting or machining, but is preferably injection molded before the sealing parts 26 are provided to complete the gasket 20.

FIG. 4a is a cross-sectional view along the lines A-A in FIGS. 3a and 3b, and FIG. 4b is a cross-sectional view along the line B-B in FIG. 3a. The presence of a second gasket 20' is indicated in the figures to show how the rim 21 is intended to be received in the indentation 22 when mounted in a battery.

A biplate 25 is shown in phantom in FIGS. 3a, 3b, 4a and 4b to indicate the position of a biplate 25 in an assembled bipolar battery. The sealing surface, i.e. a portion of the ridge 30, at least on the upper surface 1 of the gasket 20, is configured to be positioned in contact with the biplate 25 to prevent electrolyte leakage between cells when mounted in a bipolar battery. A biplate with an opening aligned with the hole 23 in the gasket 20 may alternatively be used to serve the purposes listed above.

In this embodiment, locations of the first $26_1$ and the second $26_2$ sealing parts are at least partially overlapping as projected onto an imaginary plane parallel to the upper surface of the structural part in a direction perpendicular to the upper surface 1 of the structural part 27. Thus, an offset "d" is present between the ridge 30 on the upper surface 1 compared to the ridge 30 on the lower surface 2 of the gasket 20. The reason for this is to ensure that both ridges 30 will be deformed, either directly or indirectly via a biplate 25, against the structural part 27 of an adjacent gasket 20' as indicated in FIGS. 4a and 4b. In section A-A, only one ridge 30 is present on the left side upper surface 1 since the groove 24 providing the gas channel is present on the lower surface 2. The hydrophobic properties of the material used for the structural part 27 will ensure that a continuous ionic current path conducted by electrolyte through the gas channel is inhibited between adjacent cells when mounted in a bipolar battery.

Thus, locations of the first $26_1$ and the second $26_2$ sealing parts are in this embodiment at least partially overlapping as projected onto an imaginary plane parallel to the upper surface of the structural part in a direction perpendicular to the upper surface of the structural part 27.

Figure 5A:
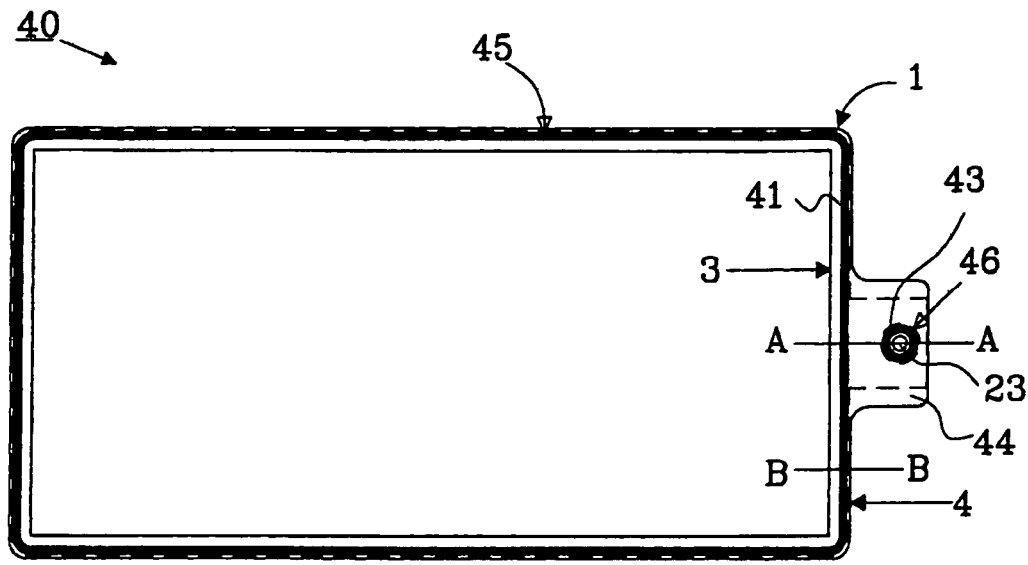
FIGS. 5a and 5b are top and bottom plan views, respectively, of a gasket according to another example embodiment of the present invention.
Figure 5B:
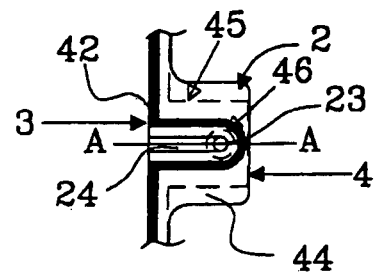

FIG. 5a shows a top plan view, and FIG. 5b shows a bottom plan view, of a gasket 40 according to another example embodiment of the present invention. Reference numbers indicating features described in connection with FIGS. 3a and 3b have been used to denote similar or identical features in FIGS. 5a and 5b. The gasket 40 comprises four parts inclusive of a structural part 44 and three separate sealing parts 41, 42 and 43. The sealing parts 41, 42 and 43 have more deformable properties than the structural part 44. Thus, the material used for sealing parts 41, 42 and 43 has a smaller elastic modulus than the material used for the structural part 44, which has a greater elastic modulus. The structural part 44 is formed as a frame and acts as a reinforcement of the gasket 40 to provide a mechanical structure, as described in connection with FIGS. 3a and 3b.

A biplate 45 provided with an opening 46 aligned with the hole 23, when placed at a mounting position, is outlined in FIGS. 5a, 5b, 6a and 6b with dashed lines. The first sealing part 41 is arranged in a closed loop on the upper surface 1 of the structural part 44. The second sealing part 42 is arranged in a closed loop on the lower surface 2 of the structural part 44 and on the outside of the hole 23, as indicated in FIGS. 5a and 5b. A third sealing part 43 is circumventing the hole 23 on the upper surface 1. The purposes of the first, second and third sealing parts are the same as described above.

Figure 6A:
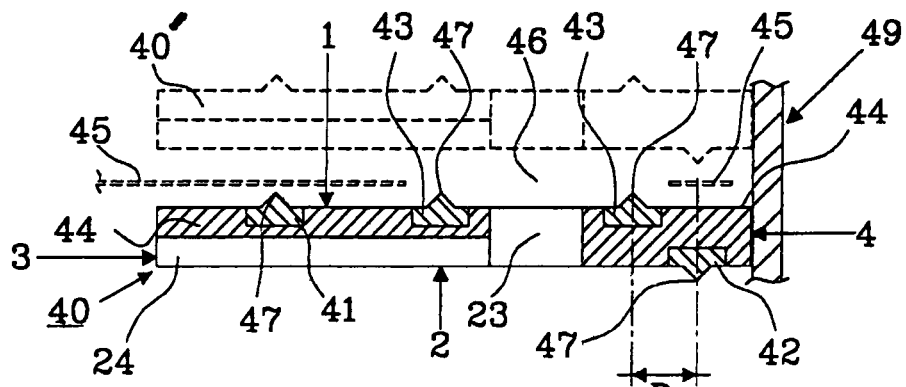
FIGS. 6a and 6b are cross-sectional views of the gasket in FIGS. 5a and 5b.
Figure 6B:
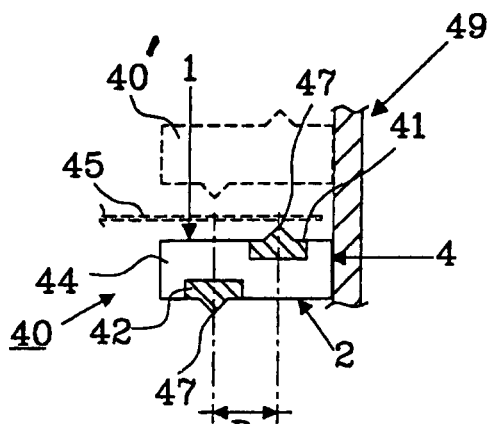

Each sealing part has a sealing surface projecting from the respective surface of the structural part 44. Each sealing surface comprises a tapered ridge 47 that extend along the closed loop. The sealing is obtained by deforming the projecting surface, i.e. the ridge 47, of each sealing part against the biplate 45, as shown in FIGS. 6a and 6b. The rim and the corresponding indentation may be omitted, as indicated in FIGS. 5a, 5b, 6a and 6b, if other means to align the gasket is used, such as arranging the gaskets in an appropriately designed casing, for example.

The structural part 44 is in this embodiment preferably manufactured in one piece by casting, machining, or molding. Each sealing part 41, 42 and 43 is separately molded, preferably injection molded, onto the structural part 44. Each sealing part 41, 42 and 43 could also be formed in a separate manufacturing process and assembled later to form the gasket 40.

FIG. 6a is a cross-sectional view along the line A-A in FIG. 5a and 5b, and FIG. 6b is a cross-sectional view along the line B-B in FIG. 5a. The presence of a second gasket 40' is indicated together with a section of a casing 49 in the figures to show that the gaskets may be aligned without a rim and indentation when mounted in a battery.

A biplate 45 is shown in phantom in FIGS. 6a and 6b to indicate the position of a biplate 45 in an assembled bipolar battery. The projecting surface, i.e. the tapered ridge 47, of the first sealing part 41 and the second sealing part 42 is configured to be positioned in contact with a biplate 45 to prevent electrolyte leakage between cells when mounted in a bipolar battery. An opening 46 in the biplate 45 is aligned with the hole 23 in the gasket 40 to serve the purposes listed above.

In this embodiment, locations of the first 41 and the second 42 sealing parts are non-overlapping as projected onto an imaginary plane parallel to the upper surface 1 of the structural part 44 in a direction perpendicular to the upper surface 1 of the structural part 44. Thus, an offset "D" is present between the ridge 47 on the upper surface 1 compared to the ridge 47 on the lower surface 2 of the gasket 40. The reason for this is to ensure that both ridges 47 will be deformed, either directly or indirectly via a biplate 45, against the structural part 44 of an adjacent gasket 40' as indicated in FIGS. 6a and 6b. In section A-A, only one ridge 47 is present on the left side upper surface 1 since the groove 24 providing the gas channel is present on the lower surface 2. The hydrophobic properties of the material used for the structural part 44 will ensure that the migration of electrolyte through the gas channel is prevented between adjacent cells when mounted in a bipolar battery.

Figure 9:
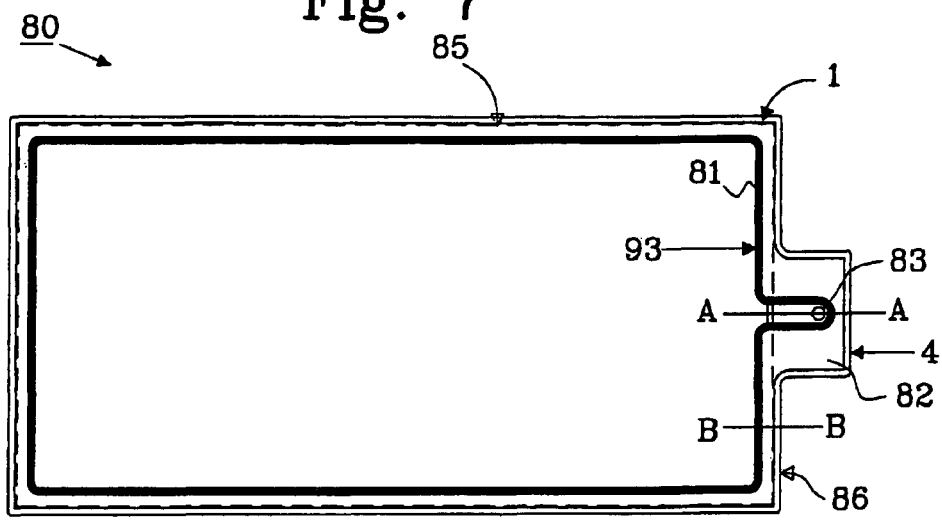
FIG. 9 is a top plan view of a gasket according to another example embodiment of the present invention.

FIG. 9 shows a top plan view of a gasket 80 according to another example embodiment of the present invention. Reference numbers indicating features described in connection with previous embodiments have been used to denote similar or identical features in FIG. 9. The gasket 80 comprises two parts inclusive of a structural part 82 and a common sealing part 81. The common sealing part 81 has more deformable properties than the structural part 82. Thus, the material used for the sealing part 81 has a smaller elastic modulus than the material used for the structural part 82, which has a greater elastic modulus. The structural part 82 is formed as a frame and acts as a reinforcement of the gasket 80 to provide a mechanical structure, as described in connection with the previous embodiments.

Figure 10B:
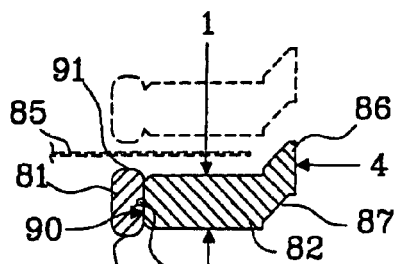
FIGS. 10a and 10b are cross-sectional views of the gasket in FIG. 9.
Figure 10A:
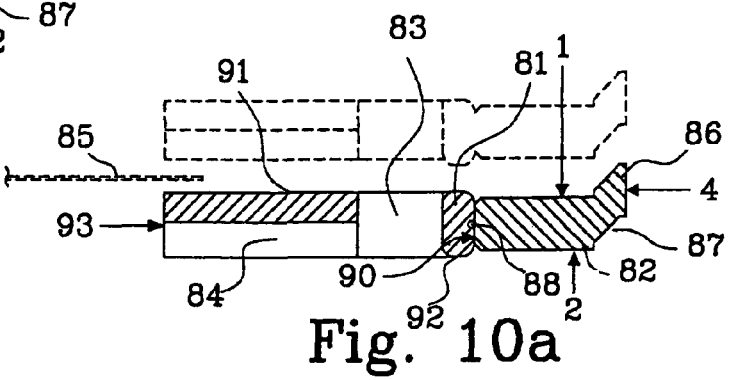

The structural part 82 has an outer surface 4 formed by a rim 86 extending from an upper surface 1, and a corresponding indentation 87 on an opposed, lower surface 2. The rim 86 and the indentation 87 will provide alignment of the gaskets 80 as discussed in connection with FIGS. 3a and 3b. With reference to FIG. 10b, the common sealing part 81 of the gasket 80 is provided with a through-hole 83 between an upper surface 91 and a lower surface 92, with a groove 84, to create a passage from the through-hole 83 to an inner surface 93 of the common sealing part 81, and thus the space contained inside the gasket 80 when a biplate 85 is mounted on both upper 1 and lower 2 surfaces of the gasket 80. The through-hole 83 and the groove 84 provide a gas channel between adjacent cells in the assembled battery. A biplate 85 is shown in phantom to indicate the position of the biplate 85 in an assembled bipolar battery.

The common sealing part 81 is provided with two sealing surfaces 91 and 92. The upper sealing surface 91 extends in a direction away from and perpendicular to the upper surface 1 of the structural part 82, thus the upper sealing surface 91 projects from the upper surface 1. The lower sealing surface 92 extends in a direction away from and perpendicular to the lower surface 2 of the structural part 82, thus the lower sealing surface 92 projects from the lower surface 2. The common sealing part 81 is preferably attached to an inner surface 90 of the structural part 82 by molding and projections 88 may be provided on the inner surface 90 to further improve the bonding.

Preferably, the material used for the sealing parts also has hydrophobic properties. A thermoplastic elastomer VERSAFLEX® CL2250 available from GLS Corp. is a suitable material for the sealing parts, and polypropylene, which is available from many suppliers, is a suitable material for the structural part. It is preferable that the material chosen for the sealing parts be chemically compatible with the electrolyte used. In an alkaline battery such as NiMH, compatibility with Potassium Hydroxide is typically required. This material should preferably be chosen to have properties such as low compression set and low creep.

It may be advantageous, but not necessarily required, to alter the design of the gasket in contact with the endplates to better nest and seal with the endplates. The endplates may have a different size than the biplates, so the gasket may need to conform to the different size.

This disclosure refers to the top and the bottom of gaskets as well as the upper and the lower surfaces of gaskets and their constituent parts. It is understood that this terminology is used to describe the spatial relationship of the parts relative to each other, and does not imply that neither the parts nor the battery that comprises them need be oriented in any special way relative to gravity for their assembly, function, or operation.

Figure 7:
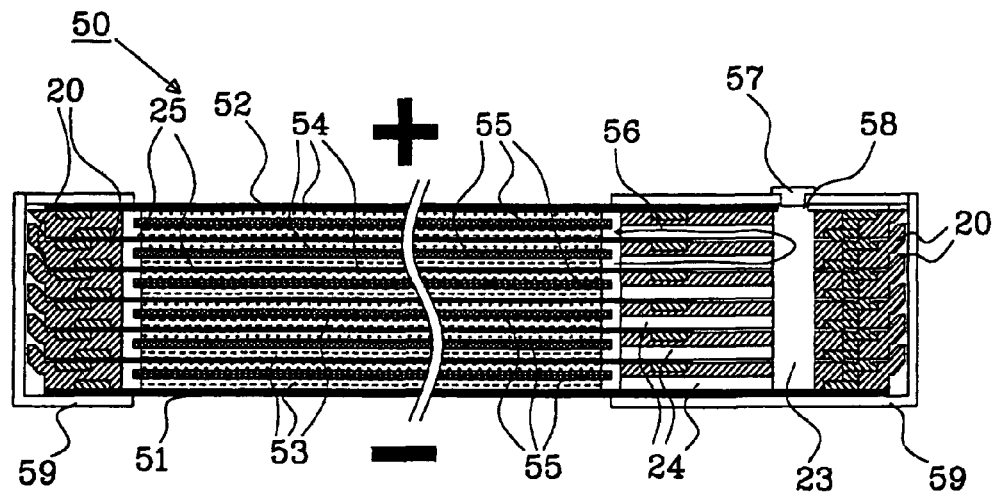
FIG. 7 is a cross-sectional view of a bipolar battery according to an example embodiment of the present invention.

FIG. 7 shows, as a non-limiting example, a starved electrolyte bipolar battery 50 in cross section having six cells arranged within a case 59. The battery comprises a negative end plate 51 and a positive end plate 52, each having a negative electrode 53 and a positive electrode 54, respectively. Five biplate assemblies, comprising a negative electrode 53 a biplate 25, and a positive electrode 54, are stacked on top of each other in a sandwich structure between the two end plates 51 and 52, which are accessible from the outside. A separator 55 is arranged between each adjacent negative and positive electrodes making up a cell, the separator 55 contains an electrolyte and a predetermined percentage of gas passages. About 5% is a typical value for gas passages in the porous volume of starved electrolyte batteries. The common gas manifold remains essentially dry, containing a negligible amount of electrolyte, if any.

A gasket 20, as described in connection with FIGS. 3a, 3b 4a and 4b, is provided between adjacent biplates 25 and/or a biplate 25 and an end plate 51 or 52. As indicated in the figure by the arrow 56, gas may flow from one cell to another and thereby all cells share a common gas space through the gas passages in the gasket. If an electrode in a cell starts to gas before the others, this pressure will be distributed through-out the whole common gas space. The gas will pass from a cell, through a groove 24 and via a through-hole 23 of a first gasket to a groove 24 of a second gasket, and thereafter into a second cell.

If the pressure within the common space exceeds a predetermined value, a pressure relief valve 57 will open to connect the common gas space with the ambient environment. The pressure relief valve 57 is arranged through one of the end plates, in this example the positive end plate 52 and comprises a feed-through 58. In an alternative embodiment, the feed-through 58 may be integrally formed onto the endplate 52.

The purpose of the case 59 is to provide the mechanical preloaded force needed over the stacked gaskets 20 to maintain the sealed gas space. Note that a non-sealed case that provides a required mechanical preloaded force may be used to create an operational bipolar battery with gaskets as described above. The gaskets described in connection with FIGS. 5a, 5b and 9 may naturally be used instead of the gaskets 20 used in the bipolar battery 50.

Figure 8:
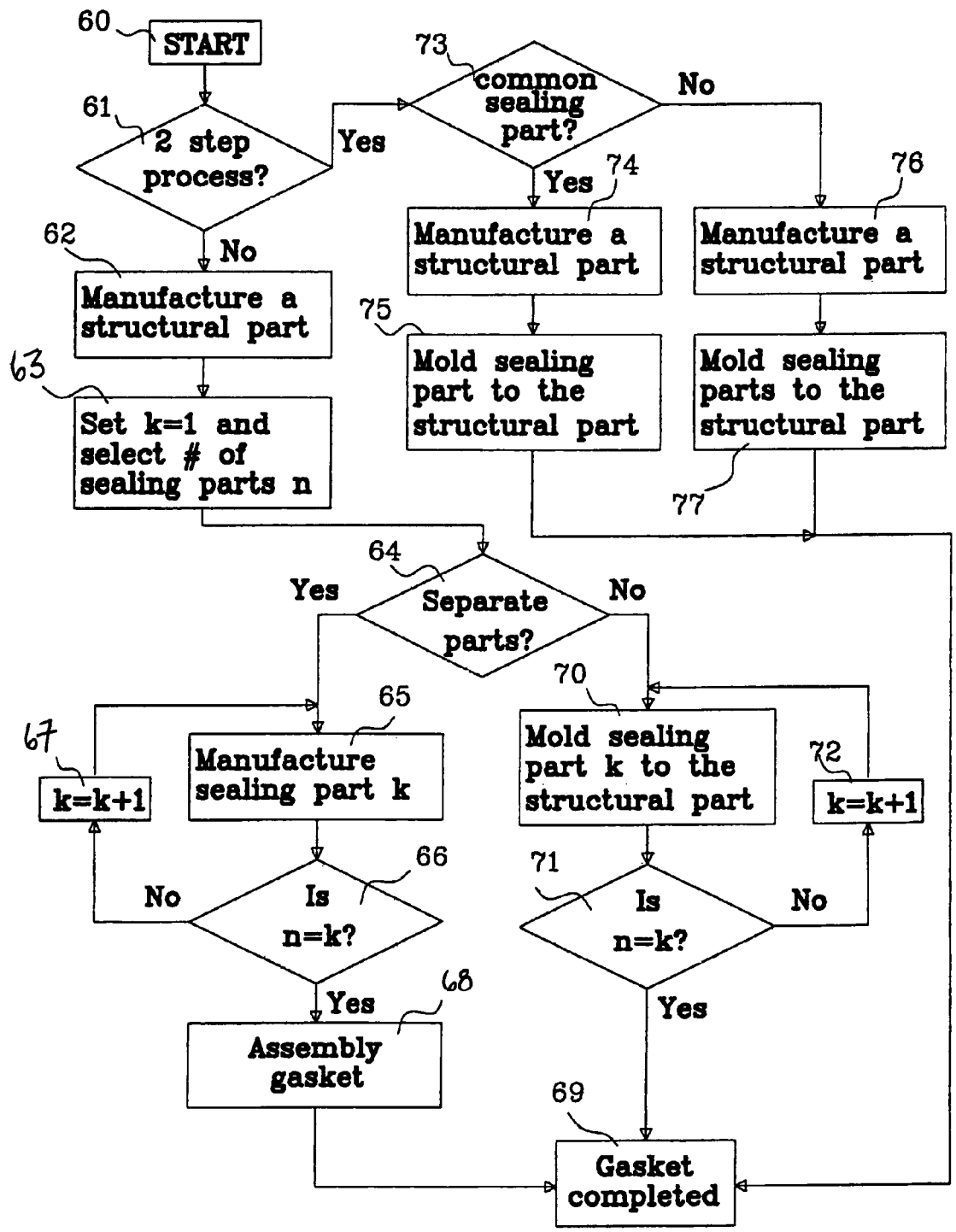
FIG. 8 is a flow chart of a process for manufacturing a gasket according to an example embodiment of the present invention.

FIG. 8 shows a flow chart for manufacturing a gasket according to an example embodiment of the present invention. The process start at step 60, and if the gasket is selected to be manufactured in more than two steps in step 61, the flow continues to step 62. A structural part is manufactured in step 62, in the shape of a frame from a first material having hydrophobic properties. A gas channel is provided through the structural part between upper and lower surfaces, and an inner surface of the structural part, and the gas channel is preferably provided only through the structural part. The first material preferably has an elastic modulus sufficiently high to provide a rigid structure.

The flow continues to step 63, wherein an integer k is set to 1 (k=1) and a variable n is set to the number of sealing parts desired, e.g. two separate parts (n=2). If the gasket is to be manufactured from separate parts, the flow proceeds to step 65 via step 64. A first sealing part is manufactured in step 65 from a second material having a lower elastic modulus compared to the elastic modulus of the first material. The first sealing part is manufactured in a closed loop, and the second material preferably has hydrophobic properties. If n≠k in step 66, then the flow is fed back to step 65 via step 67 in which the integer k is increased by one, i.e. k=k+1. A second sealing part is thereafter manufactured in the repeated step 65 and the steps are repeated until n=k in step 66, and then the flow continues to step 68. The gasket is assembled in step 68 by arranging the separate sealing parts to the structural part in such a way that the closed loop of at least the first and a second sealing part are arranged along the frame on opposite surfaces of the structural part. The gasket is completed and the flow ends in step 69.

If a decision not to make separate parts is taken in step 64, the flow continues to step 70 in which the first sealing part is molded, preferably injection molded, from a second material on a surface of the structural part. If n≠k in step 71, then the flow is fed back to step 70 via step 72 in which the integer k is increased by one, i.e. k=k+1. A second sealing part is thereafter molded, preferably injection molded, to the structural part in the repeated step 70 and the steps are repeated until n=k in step 71. The gasket is then completed and the flow ends in step 69.

On the other hand if the gasket is selected to be manufactured in only two steps in step 61, the flow continues to step 73 wherein a decision is made whether a common sealing part is to be used. If a common sealing part is to be used, a structural part is manufactured in step 74, in the shape of a frame from a first material preferably having hydrophobic properties. The flow will continue directly to step 75 to mold the common sealing part to the structural part. The common sealing part made from a second material having a lower elastic modulus compared to the elastic modulus of the first material is provided in a closed loop along inner surface of the structural part. The sealing part is made in a molding process, preferably an injection molding process, and the second material has hydrophobic properties since a gas channel is provided through the common sealing part. The gasket is then complete and the flow ends in step 69.

On the other hand, if several sealing parts are to be used the flow continues to step 76 where a structural part is manufacture in the shape of a frame from a first material having hydrophobic properties. Openings are also provided along the frame of the structural part in step 76. A gas channel may also be provided through the structural part between upper and lower surfaces, and an inner surface of the structural part, and the gas channel is preferably provided only through the structural part. The first material preferably has an elastic modulus sufficiently high to provide a rigid structure.

The flow continues to step 77, in which at least sealing parts made from a second material having a lower elastic modulus compared to the elastic modulus of the first material are simultaneously provided in closed loops along the frame at least on an upper and lower surface of the structural part. The sealing parts are made in a molding process, preferably an injection molding process, and the second material preferably has hydrophobic properties. Other parts may also be molded simultaneously, e.g. circumscribing the hole of the gas channel in the structural part. The openings in the structural part provide the possibility to simultaneous mold the sealing parts in an overmolding process. The gasket is then complete and the flow ends in step 69.

The structural part is preferably manufactured in an injection molding process, but may be manufactured using other types of techniques, such as machining and casting.

What is claimed is:

1. A gasket comprising:
    a structural part in the shape of a frame and having an upper surface and a lower surface, the structural part being made from a first material;
    at least one channel to permit gas passage through the gasket;
    a first sealing part provided on the structural part and projecting beyond the upper surface to provide at least a first sealing surface arranged in a closed loop;
    a second sealing part provided on the structural part and projecting beyond the lower surface to provide at least a second sealing surface arranged in a closed loop;
    the first and the second sealing parts being made from a second material;
    at least one of the first material and the second material having hydrophobic properties; and
    the first material having a higher elastic modulus than the second material.

2. The gasket according to claim 1, wherein the structural part is provided with a rim and a corresponding indentation at an outer surface.

3. The gasket according to claim 1, wherein the first sealing part and the second sealing part are provided as a single, common sealing part attached to an inner surface of the structural part.

4. The gasket according to claim 3, wherein the structural part is provided with projections on the inner surface.

5. The gasket according to claim 3, wherein the at least one channel is provided through the common sealing part between the first and the second sealing surfaces and an inner surface of the common sealing part, the second material having hydrophobic properties.

6. The gasket according to claim 5, wherein the at least one channel comprises at least one hole extending between the first and the second sealing surfaces of the common sealing part, the hole being in communication with the inner surface of the common sealing part.

7. The gasket according to claim 1, wherein the first sealing part and the second sealing part are spaced apart from each other.

8. The gasket according to claim 1, wherein the at least one channel is provided through the structural part between the upper and the lower surfaces and an inner surface of the structural part.

9. The gasket according to claim 8, wherein the at least one channel comprises at least one hole between the upper and the lower surfaces of the structural part, the hole being in communication with the inner surface of the structural part.

10. The gasket according to claim 9, further comprising a third sealing part provided on the upper surface of the structural part and arranged to circumscribe the at least one hole, the third sealing part providing a third sealing surface.

11. The gasket according to claim 1, wherein each of the first and the second sealing surfaces comprises a ridge provided along the closed loops of the first and the second sealing parts.

12. The gasket according to claim 11, wherein a recess is provided on each side of the ridge along the closed loops of the first and the second sealing parts.

13. The gasket according to claim 1, wherein at least one opening is provided between the upper and the lower surfaces of the structural part, and the first sealing part and the second sealing part are interconnected through the at least one opening.

14. The gasket according to claim 13, wherein multiple openings are provided along the structural part.

15. The gasket according to claim 1, wherein locations of the first and the second sealing parts are at least partially overlapping as projected onto an imaginary plane parallel to the upper surface of the structural part in a direction perpendicular to the upper surface of the structural part.

16. The gasket according to claim 1, wherein locations of the first and the second sealing parts are non-overlapping as projected onto an imaginary plane parallel to the upper surface of the structural part in a direction perpendicular to the upper surface of the structural part.

17. The gasket according to claim 1, wherein the first material has hydrophobic properties.

18. The gasket according to claim 1, wherein the gasket is made through an overmolding injection molding process.

19. A battery comprising:
 a case;
 a negative endplate in contact with a negative electrode;
 a positive endplate in contact with a positive electrode;
 at least one set of a negative electrode, a biplate and a positive electrode arranged in a sandwich structure between the negative and the positive endplates;
 at least one separator arranged between each negative and positive electrode, the separator including an electrolyte; and
 a gasket having
  a structural part in the shape of a frame, having an upper surface and a lower surface, and being arranged between each biplate, or between a biplate and the positive and the negative endplates, the structural part being made from a first material,
  at least one channel to permit gas passage through the gasket thereby creating a common gas space for a plurality of cells in the battery,
  a first sealing part provided on the structural part and projecting beyond the upper surface to provide at least a first sealing surface arranged in a closed loop,
  a second sealing part provided on the structural part and projecting beyond the lower surface to provide at least a second sealing surface arranged in a closed loop,
  the first and the second sealing parts being made from a second material,
  at least one of the first material and the second material having hydrophobic properties, and
  the first material having a higher elastic modulus than the second material, to provide a sealing to each biplate and the positive and negative endplate, whereby a pressure tight seal of the battery is obtained within the case.

20. The battery according to claim 19, wherein the structural part is provided with a rim and a corresponding indentation at an outer surface, the rim at least partially encompassing the biplate.

21. The battery according to claim 19, wherein the first sealing part and the second sealing part are provided as a single, common sealing part attached to an inner surface of the structural part.

22. The battery according to claim 21, wherein the structural part is provided with projections on the inner surface.

23. The battery according to claim 21, wherein the at least one channel is provided through the common sealing part between the first and the second sealing surfaces and an inner surface of the common sealing part, the second material having hydrophobic properties.

24. The battery according to claim 23, wherein the at least one channel comprises at least one hole extending between the first and the second sealing surfaces of the common sealing part, the hole being in communication with the inner surface of the common sealing part.

25. The battery according to claim 19, wherein the first sealing part and the second sealing part are spaced apart from each other.

26. The battery according to claim 19, wherein the at least one channel is provided through the structural part between the upper and the lower surfaces and an inner surface of the structural part.

27. The battery according to claim 26, wherein the at least one channel comprises a hole in the structural part, the hole being in communication with the inside of the pressure tight seal in each cell through the inner surface of the structural part.

28. The battery according to claim 27, further comprising a third sealing part provided on the upper surface of the structural part and arranged to circumscribe the hole, the third sealing part providing a third sealing surface.

29. The battery according to claim 19, wherein each of the first and the second sealing surfaces comprises a ridge provided along the closed loops of the first and the second sealing parts.

30. The battery according to claim 29, wherein a recess is provided on each side of the ridge along the closed loops of the first and the second sealing parts.

31. The battery according to claim 19, wherein at least one opening is provided between the upper and the lower surfaces of the structural part, and the first sealing part and the second sealing part are interconnected through the at least one opening.

32. The battery according to claim 31, wherein multiple openings are provided along the structural part.

33. The battery according to claim 19, wherein locations of the first and the second sealing parts are at least partially overlapping as projected onto an imaginary plane parallel to the upper surface of the structural part in a direction perpendicular to the upper surface of the structural part.

34. The battery according to claim 19, wherein locations of the first and the second sealing parts are non-overlapping as projected onto an imaginary plane parallel to the upper surface of the structural part in a direction perpendicular to the upper surface of the structural part.

35. The battery according to claim 19, wherein the first material of the gasket has hydrophobic properties.

36. The battery according to claim 19, wherein the gasket is made through an overmolding injection molding process.

37. The battery according to claim 19, wherein the battery is a NiMH battery.

38. The gasket according to claim 1, wherein the second material is deformable.

* * * * *